United States Patent [19]

Alley et al.

[11] 4,441,545

[45] Apr. 10, 1984

[54] AIR CONDITIONING THERMOSTATIC CONTROL SYSTEM HAVING MODULAR INCLUSION OF REMOTE TEMPERATURE SET-BACK CAPABILITY

[75] Inventors: Robert P. Alley, Manlius; John W. Relyea, Warners, both of N.Y.; Donald L. Sidebottom, Louisville, Ky.

[73] Assignee: General Electric Company, Louisville, Ky.

[21] Appl. No.: 401,489

[22] Filed: Jul. 26, 1982

[51] Int. Cl.³ .................. G05D 23/00; H03K 5/153
[52] U.S. Cl. .................................. 165/26; 236/47; 236/51; 307/360
[58] Field of Search .............. 236/46 R, 47, 51; 165/12, 26; 307/494, 360

[56] References Cited

U.S. PATENT DOCUMENTS

| | | | |
|---|---|---|---|
| 3,346,846 | 10/1967 | Ferguson et al. | 307/360 X |
| 3,386,496 | 6/1968 | O'Connor | 165/26 |
| 3,616,846 | 11/1971 | Wills | 165/26 |
| 3,645,325 | 2/1972 | Lorenz | 165/14 |
| 3,721,834 | 3/1973 | Hirschfeld | 307/362 X |
| 3,725,644 | 4/1973 | Bailey | 236/1 C |
| 3,761,018 | 9/1973 | Rekai | 164/16 |
| 3,964,677 | 6/1976 | Schalon et al. | 236/46 R |
| 3,972,471 | 8/1976 | Ziegler | 236/51 X |
| 4,060,123 | 11/1977 | Hoffman et al. | 165/26 |
| 4,077,566 | 3/1978 | Bradford | 236/51 |
| 4,132,355 | 1/1979 | Cleary et al. | 236/51 |
| 4,174,064 | 11/1979 | Pratt, Jr. | 236/51 |
| 4,193,006 | 3/1980 | Kabat et al. | 236/1 C |
| 4,284,126 | 8/1981 | Dawson | 236/51 |
| 4,286,939 | 9/1981 | Pohl et al. | 236/51 |
| 4,290,481 | 9/1981 | Pohl | 165/26 |
| 4,339,074 | 7/1982 | Nissmo et al. | 236/47 |
| 4,347,974 | 9/1982 | Pinckaers et al. | 236/47 X |

OTHER PUBLICATIONS

Operational Amplifiers & Linear Integrated Circuits, Coughlin et al., 1977.
Modern Dictionary of Electronics, Rudolf Graf, 1972.

*Primary Examiner*—William E. Wayner
*Attorney, Agent, or Firm*—Frank P. Giacalone; Radford M. Reams

[57] ABSTRACT

Methods and circuits for providing auxiliary or remote temperature set or set-back capability in comparator-based thermostatic temperature control systems. In particular, the invention is applicable to thermostatic control systems of the general type including a temperature-responsive source for producing a temperature-dependent voltage as a function of sensed temperature, a reference voltage source for establishing a temperature set point, a voltage comparator having a comparison input and a reference input for producing a control output signal for energizing a thermal conditioning element when voltages applied respectively to the comparison and reference inputs have at least a predetermined relationship with respect to each other, an electrical connection between said temperature-responsive voltage source and the comparison input, and an electrical connection between the reference voltage source and the reference input. For remote temperature setting, the set point voltage applied to the comparator reference input is forced towards a particular value representative of a particular temperature by employing an auxiliary reference voltage source having an output impedance lower than that of the reference voltage source. Preferably, the auxiliary reference voltage source includes, as an output element, a unity-gain operational amplifier.

8 Claims, 6 Drawing Figures

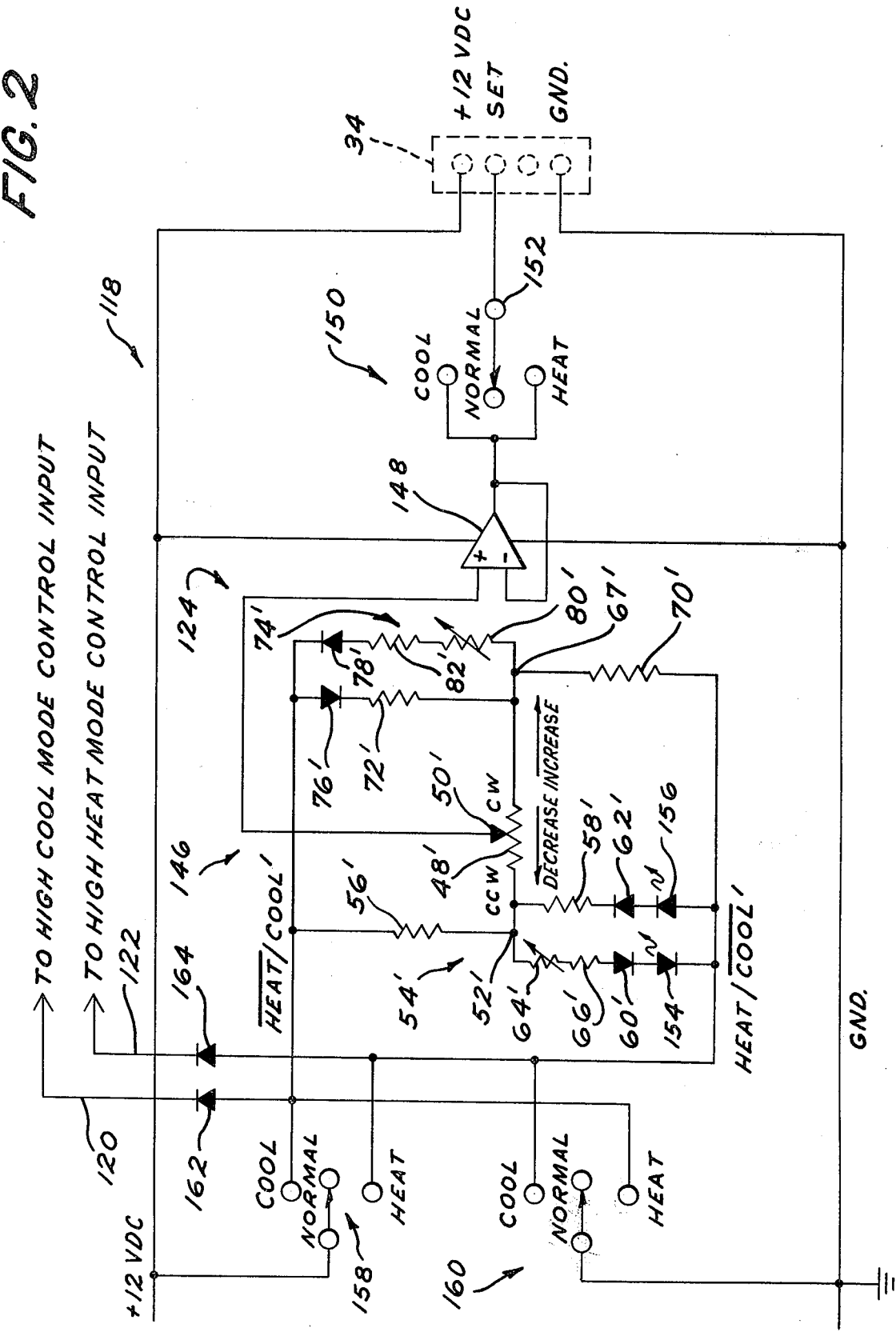

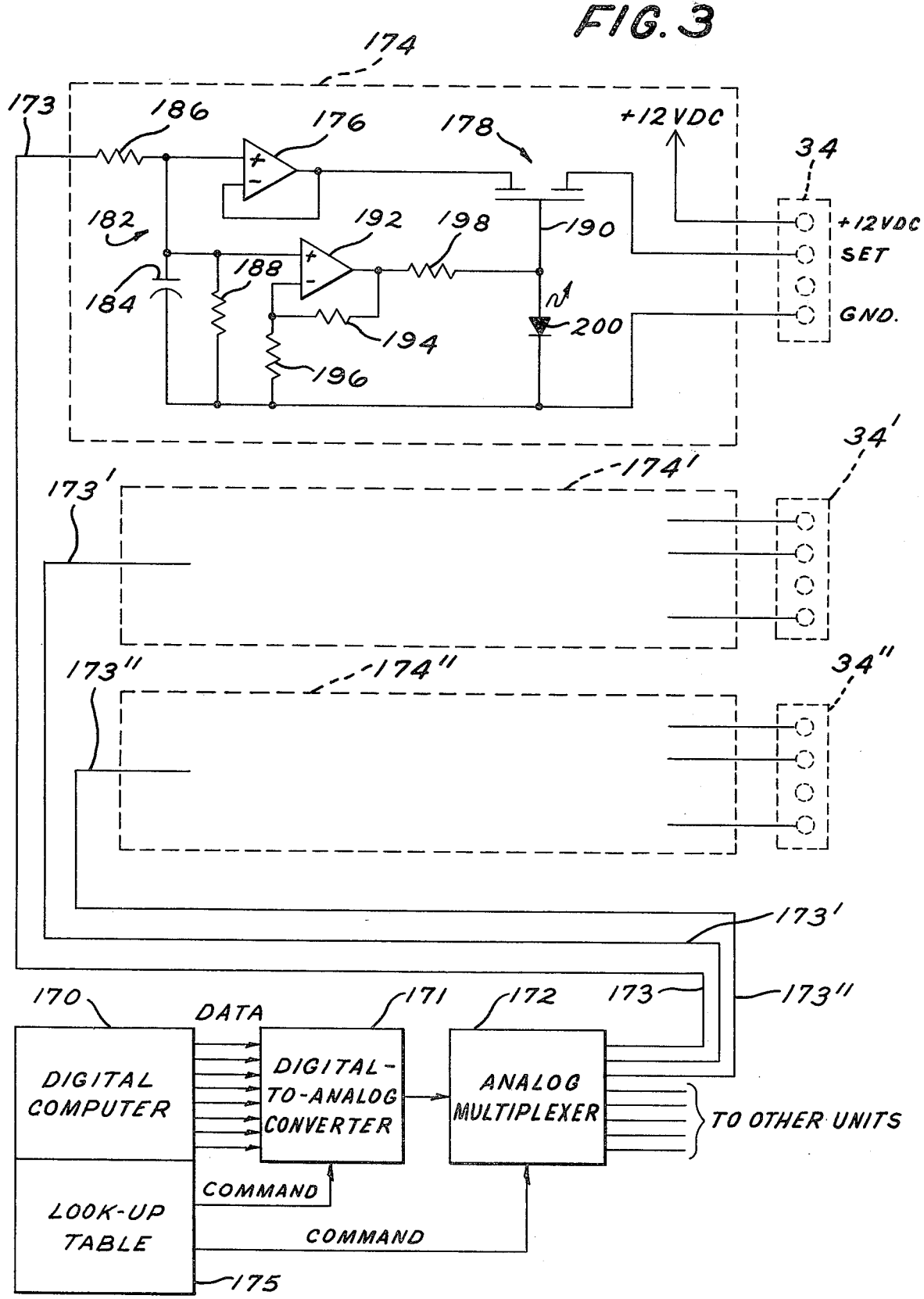

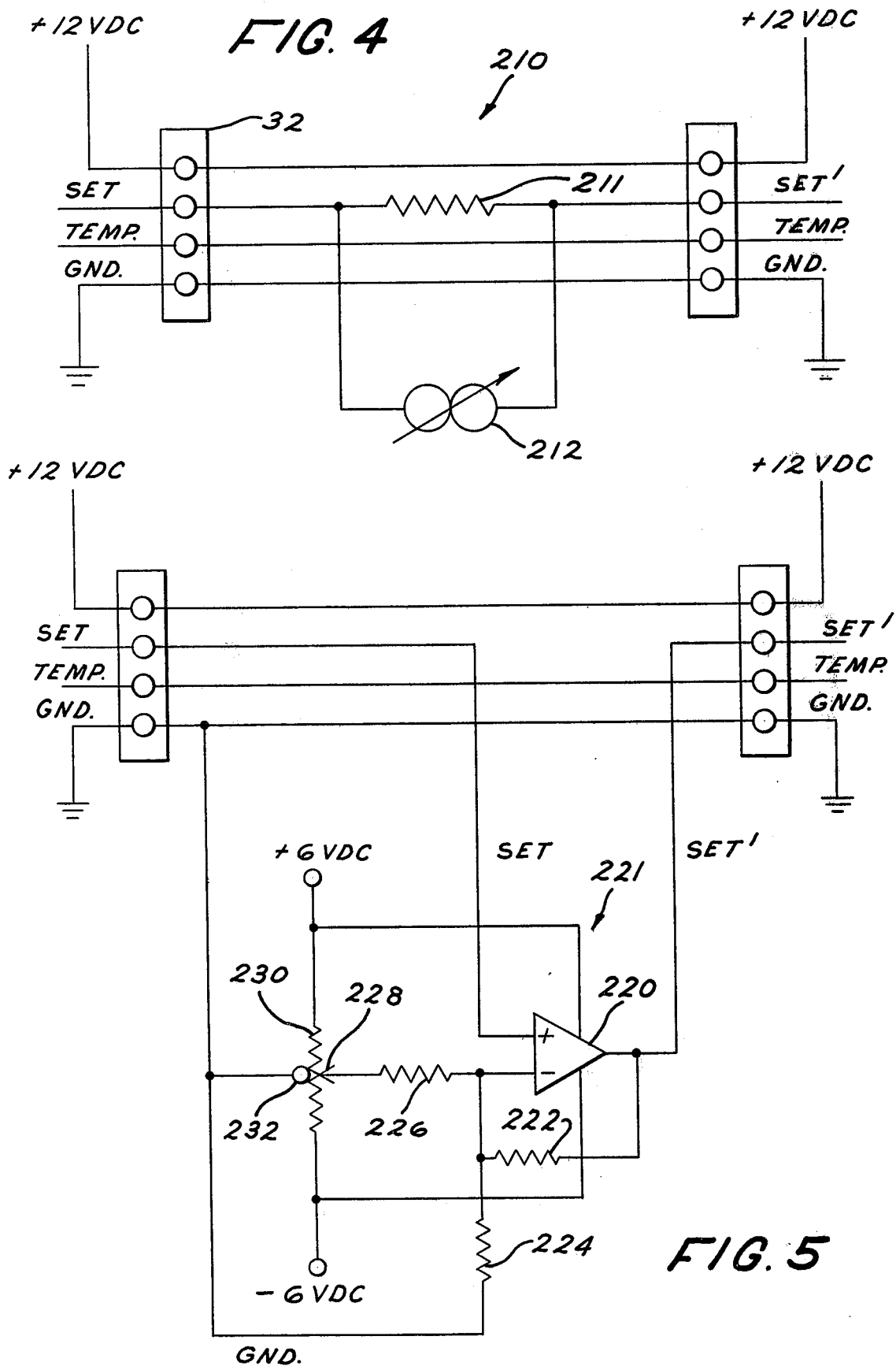

AIR CONDITIONING THERMOSTATIC CONTROL SYSTEM HAVING MODULAR INCLUSION OF REMOTE TEMPERATURE SET-BACK CAPABILITY

BACKGROUND OF THE INVENTION

The present invention relates generally to temperature control systems for air conditioning units, including multiple mode air conditioning units, and, more particularly, to systems and methods for selectively remotely altering a locally-determined temperature setting through either auxiliary temperature set or auxiliary temperature set-back capability. The invention further relates to modular addition of such capabilities to existing thermostatic control systems with minimal design change.

A common configuration for a building heating and cooling system employs an individual air conditioning in each room of a hotel, office building or the like, with individual room thermostatic and mode selection control. Such a system desirably facilitates zoned operational mode and temperature control. That is, the operational mode and temperature of each room unit may individually be adjusted as desired.

In some such installations including a plurality of air conditioning units, central desk control stations have been provided for remotely controlling operational mode and temperature for energy conservation features. As will be appreciated, the ability to remotely control zone units is a desirable feature which permits overall economy of operation where not all rooms are occupied or in use at the same time. Unneeded units may either simply by turned off, or have the locally selected temperature setting varied. There are various circumstances in which it is desirable to permit the temperature of an unoccupied, or even an occupied, room to deviate from a nominal temperature. For example, in cold weather it may be desired to permit the temperature to drop somewhat, and in warm weather to let the temperature increase somewhat.

To these ends, various forms of remote or auxiliary temperature set-back, remote temperature set, and remote mode control capability have been proposed. For example, central desk control systems providing remote control of both mode and temperature are disclosed in Pratt, Jr. U.S. Pat. No. 4,174,064 and in Dawson U.S. Pat. No. 4,284,126. Central systems for remotely controlling temperature are disclosed in Bradford U.S. Pat. No. 4,077,566 and in Cleary et al U.S. Pat. No. 4,132,355. A system for introducing "false heat" to provide appropriate set back for heating and cooling is disclosed in O'Connor U.S. Pat. No. 3,386,496. Central systems for remotely controlling mode are disclosed in commonly-assigned Pohl et al U.S. Pat. No. 4,287,939 and in commonly-assigned Sidebottom U.S. Patent application Ser. No. 365,764 filed Apr. 5, 1982. Hoffman et al U.S. Pat. No. 4,060,123 discloses a form of auxiliary temperature control system wherein power to a room air conditioning unit is selectively interrupted during a low-energy mode to thermostatically maintain an alternative temperature when the room is not occupied.

In recent years, a variety of thermostatic control circuits which are electronic in nature have been developed. Such electronic thermostatic control systems typically include a voltage comparator having a comparison input and a reference input. A typical comparator is an integrated circuit device specifically adapted for voltage comparison. The output of the comparator is connected, usually through additional signal conditioning and logic circuitry, to control and energization of a thermal conditioning element such as a heater or refrigeration producer. A voltage comparator functions to produce the control output signal for energizing the thermal conditioning element when the comparison and reference inputs have a predetermined relationship to each other, for example, one being more positive than the other.

Connected to the comparator comparison input in a typical circuit is a temperature responsive voltage source comprising, for example, a thermistor included in a resistive network arrangement such as a voltage divider. Connected to the reference input is a reference voltage source providing a user-adjustable reference voltage for establishing a temperature setting. Thus, the reference input voltage establishes a switching threshold, and switching of the comparator output from one logic state to the other occurs as the comparison input voltage crosses the switching threshold. With appropriate connections, taking into account voltage polarities and logic sense, the thermal conditioning element cycles on and off as required to maintain the user-set temperature.

In one variation, the reference voltage source is fixed, and the user temperature setting control varies the characteristics of the thermistor voltage divider, which may comprise a thermistor and a variable resistance in series. The present invention is applicable to this variation as well.

Examples of this general type of comparator-based thermostatic-control circuit are disclosed in Wills U.S. Pat. No. 3,616,846, in Bailey U.S. Pat. No. 3,725,644, in commonly-assigned Pohl U.S. Pat. No. 4,290,481, and in commonly-assigned Alley et al application Ser. No. 151,855, filed May 21, 1980, now U.S. Pat. No. 4,346,755. The disclosure of this Alley et al U.S. Pat. No. 4,346,755 is of additional interest for its disclosure of a two-stage, comparator-based thermostatic control system wherein the temperature switching thresholds of two comparators are offset from each other to provide two stages of either heating or cooling.

When remote temperature setting or set-back capability is included in such a comparator-based thermostatic control system, there must be some means to selectively establish a new temperature set point (for a remote temperature set system) or to offset the user-determined temperature setting (for a remote temperature set-back system). These two functional concepts are similar, but differ in that remote temperature setting implies, ideally, absolute setting to a particular temperature regardless of the local temperature setting. Remote temperature set-back implies merely shifting the temperature set point a certain number of degrees relative to the locally set temperature. Several approaches toward achieving these ends have been proposed in the prior art. A typical approach involves a single-pole, double-throw switching arrangement which alternately selects one circuit element (or subcircuit) or the other depending upon whether the individual unit is in a normal or a remote mode of operation.

SUMMARY OF THE INVENTION

Accordingly, it is an object of the invention to provide systems and methods for applying auxiliary temperature set and auxiliary temperature set-back capability to comparator-based thermostatic control systems of the general type summarized hereinabove.

It is another object of the invention to provide systems and methods for incorporating such auxiliary temperature set and set-back capability with a minimum of modification or design change to previously-developed circuits.

It is yet another object of the invention to provide systems and methods for auxiliary temperature set and temperature set-back capability which are applicable either to relatively simple systems having one or a very few individual room units, or to large multiple-room structures with more complex multiplexed communication systems for directing appropriate command signals to various individual room units.

It is yet another object of the invention to provide systems for combined remote temperature setting or set-back and remote mode control.

Briefly, and in accordance with an overall concept of the invention, for auxiliary temperature setting the set point voltage applied to the comparator reference input is selectively forced towards a value representative of a particular temperature by employing an auxiliary reference voltage source having an output impedance lower than the output of the reference voltage source. (The output impedance of the reference voltage source must at least be non-zero, and preferably substantially higher than zero.) By way of specific example, a typical user-adjustable voltage source for primary temperature setting comprises a potentiometer having end terminals connected to appropriate fixed supply voltages, with the potentiometer movable contact serving as an adjustable voltage divider tap point. A typical output impedance at the tap point is in the order of 10K ohms. The auxiliary reference voltage source includes, as an output element, a unity-gain operational amplifier having a relatively low output impedance, for example, less than 100 ohms. The operational amplifier output is connected through a switching element to the voltage comparator reference input such that the auxiliary reference voltage source at least partly (depending upon the relative output impedance levels) overrides the reference voltage source when the switching element is conducting. Significantly, the invention permits the primary reference voltage source to remain connected to the comparator at all times.

An important advantage of such a system in accordance with the invention is that it can be added, with essentially no modification, to an existing comparator-based thermostatic control circuit. All that is necessary is to gain access to some point along the connection between the reference voltage source and the comparator reference input so as to inject, under switch control, the auxiliary reference voltage level.

In a flexible system, the auxiliary reference voltage source is adjustable, thereby facilitating remote temperature control to any desired temperature within equipment capability.

The remote temperature set system of the invention is adaptable to digital control and transmission techniques. Suitable digital temperature control signals can be generated, such as by a computer, and connected to the input of a digital-to-analog inverter having its output in turn connected through a unity-gain operational amplifier and the switching element to the comparator reference input. In a large scale system including a plurality of individual room units, each having a temperature-responsive voltage source, a corresponding reference voltage source, and a corresponding voltage comparator connected for energizing a corresponding thermal conditioning element, a single source of command signals can be shared in multiplexed fashion to serve as the auxiliary reference voltage source for each individual unit.

The concepts of the invention are particularly adaptable to modular type control systems wherein one module includes user control circuitry such as the temperature responsive source comprising a resistive voltage divider and the reference voltage source comprising a user-adjustable potentiometer, and wherein the other module includes the voltage comparator and other power switching elements for energizing the thermal conditioning element. In such case, the modules are interconnected through a conventional terminal or plug-in arrangement, facilitating access to the appropriate point in the circuit to connect the remote temperature set voltage. In such cases, the remote temperature set unit may simply comprise yet another module, available as a system option, and connected, when provided, to appropriate connector terminals.

In control systems having provision for remote mode control capability, such as for example is disclosed in commonly-assigned Pohl et al U.S. Pat. No. 4,287,939, a relatively remote auxiliary mode and temperature setting unit can be provided including an auxiliary reference voltage source and an auxiliary mode control switch connected to the mode selection control circuit. In some systems, the voltage as a function of temperature set point characteristic of the reference voltage source varies depending upon whether heating mode or cooling mode is selected. For such event, advantageously the auxiliary mode control switch also selects the characteristics of the auxiliary reference voltage source.

In accordance with another overall concept of the invention, a system and method are provided for auxiliary or remote temperature set-back in a comparator-based temperature control system of the general type described above wherein there are electrical connections between the temperature responsive voltage source and the comparator comparison input and an electrical connection between the reference voltage source and the comparator reference input. In particular, an element is connected in series with one of the electrical connections for selectively introducing an offset voltage. The offset voltage, when introduced, effectively shifts the temperature set point. Preferably, the offset voltage introduced is adjustable, by remote control, to shift the temperature set point any desired number of degrees.

This approach of the invention for remote temperature offset also lends itself particularly well to a modular type system, and the necessary circuitry for adding remote temperature set-back capability may comprise simply an optional system module. In a modular system wherein connections between the temperature responsive source and the reference voltage source and the comparator go through a connector arrangement, the connector provides a convenient access point for connecting the series element.

A preferred form of series element comprises a unity-gain operational amplifier circuit arranged to introduce a controlled voltage offset. In one form, the series element is connected to receive control signals from a source of command signals in digital form and a digital-to-analog inverter. A more extensive thermostatic control system in accordance with the invention may comprise a plurality of individual units each including a temperature-responsive voltage source, a corresponding reference voltage source, a corresponding voltage comparator connected for energizing, a corresponding thermal conditioning unit, and a corresponding series element, with a single source of command signals shared in multiplexed fashion to provide control signals to the individual series elements.

It will be appreciated that the auxiliary temperature set and temperature set-back concepts of the invention apply both to auxiliary control units located relatively remotely from the controlled unit, for example in a central desk system, and to auxiliary control units co-located with the controlled unit, particularly for purposes of set-back. Accordingly, insofar as the circuitry and control concepts of the invention are concerned, the terms "remote" and "auxiliary" are nearly synonymous.

BRIEF DESCRIPTION OF THE DRAWINGS

While the novel features of the invention are set forth with particularity in the appended claims, the invention, both as to organization and content, will be better understood and appreciated, along with other objects and features thereof, from the following detailed description taken in conjunction with the drawings in which:

FIG. 2 is an electrical schematic diagram illustrating one embodiment of a system in accordance with the invention incorporating remote temperature set capability;

FIG. 3 is a combination block diagram and electrical schematic circuit diagram of a more comprehensive system comprising a plurality of individual room units;

FIG. 4 is an electrical schematic diagram conceptually depicting an approach to selective temperature offset capability in accordance with the invention;

FIG. 5 is an electrical schematic diagram of one specific implementation of a thermostatic control system having selective temperature offset capabilities.

DESCRIPTION OF THE PREFERRED EMBODIMENTS

Figure 1:
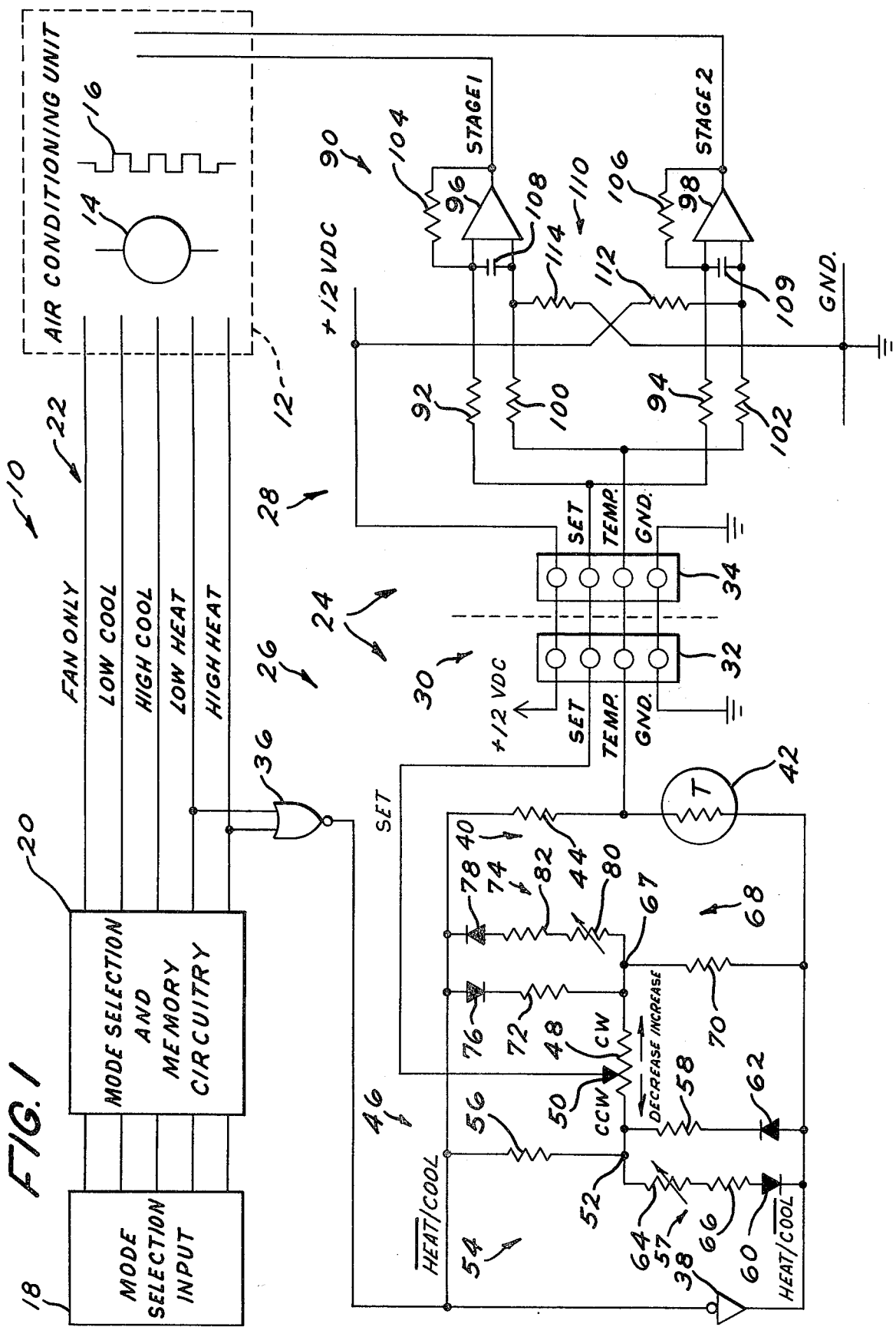
FIG. 1 is an electrical schematic drawing of a basic modular comparator-based thermostatic temperature and operational mode control circuit of one general type to which the present invention may be applied.

Referring now to FIG. 1, a combined mode and comparator-based thermostatic temperature control system 10 of one general type to which the present invention can be applied is shown connected to an air conditioning unit 12 having a plurality of operational modes. The air conditioning unit 12 may take a variety of forms and there is accordingly no intention to limit the present invention for use in combination with any particular such unit other than as set forth in the appended claims. As one example, the unit 12 is sized for conditioning air temperature in a single room, and includes an air cooling subsystem comprising a closed circuit refrigeration system having a refrigerant compressor 14 and a refrigerant evaporator (not shown) in heat exchange relationship with a fan-forced recirculating indoor air flow. The exemplary unit 12 also includes a separate heating subsystem comprising electrical resistance heaters represented at 16. As another example, the closed circuit refrigeration system may be reversible and comprise what is conventionally termed a "heat pump" to provide heating as well as cooling, with the electrical resistance heaters employed for supplemental purposes, or as a second stage of heat. As yet another example, a reversible air valve heat pump may be employed wherein the refrigerant evaporator and condenser (neither shown) retain their usual functions relative to the closed circuit refrigeration system, but indoor and outdoor air flows are selectively alternatively directed over the evaporator and condenser. From this brief summary, it will be appreciated that the term "air conditioning" is employed herein in a broad sense to include any form of unit which alters the characteristics of room air, for example by either heating, cooling, or both.

Thus, it will be appreciated that the compressor 14 and electrical resistance heater 16 are representative of thermal conditioning elements which are energized on and off as required under thermostatic control to maintain a desired or preset temperature within the conditioned space.

While the circuits of the invention are suitable for use with heating control systems, cooling systems, or both, and additionally are suitable for use in either single-stage or dual-stage systems, the circuits of the invention disclosed herein for purposes of illustration are for a dual-stage heating and cooling system including a heat pump, auxiliary electrical resistance heaters, and dual-speed evaporator and condenser air circulation fans. For the first stage of either heating or cooling, the refrigerant compressor is energized, and the evaporator and condenser fans are operated at low speed. When additional heating or cooling is required, the second stage of heating or cooling is activated. The second stage for heating mode operation involves energizing the supplemental electric resistance heater, along with switching the fans to the relatively higher speed of operation. The second stage for cooling mode operation involves switching both fans to their higher speed of operation.

For controlling the operational mode of the air conditioning unit 12, shown in FIG. 1 is a relatively local user mode selection input device 18, for example comprising a plurality of momentary push button switches, connected to a mode selection and memory circuit 20. The mode selection memory circuit 20 is connected through a representative set 22 of conductors to the air conditioning unit 12 for directing the air conditioning unit to operate in one of a plurality of possible modes, depicted for purposes of example as "Fan Only", "Low Fan Speed Cool", "High Fan Speed Cool", "Low Fan Speed Heat", and "High Fan Speed Heat". It will be appreciated that the details of the mode selection input 18, the mode selection and memory circuit 20, and the connections to the air conditioning unit 12 are highly dependent on the particular form of air conditioning unit 12 employed, and its particular control requirements. Further details of suitable mode selection inputs 18 and mode selection memory circuits 20 may be had by reference to commonly-assigned Pohl et al U.S. Pat. No. 4,287,939 and to commonly-assigned Sidebottom application Ser. No. 365,766 filed Apr. 5, 1982.

The remaining circuitry depicted in FIG. 1 comprises a dual-stage, comparator-based thermostatic control circuit 24 of modular arrangement. The illustrated circuit is similar to the dual-stage, comparator-based thermostatic control circuit disclosed in the above-identified commonly-assigned Alley et al application Ser. No. 151,855. While the illustrated embodiments are a dual stage system, as noted above the concepts of the invention apply equally well to single-stage comparator-based thermostatic control systems, such as is disclosed in commonly-assigned Pohl U.S. Pat. No. 4,290,481.

This thermostatic control circuit 24 is divided into a voltage source section 26 included within a user entry module, and a comparator section 28 included within a main control module located with the air conditioning unit 12. These two sections are separated by an electrical connector arrangement 30 comprising a pair of connector portions 32 and 34, each having a plurality of terminals. It will be appreciated that the electrical connector arrangement 30 can take a variety of forms. Typical examples are a terminal strip arrangement, a plug and socket arrangement, or a connector mounted on a printed circuit board.

In the illustrated circuit, a suitable +12 volt DC power supply (not shown) is included within the main module 28, and furnishes this voltage between +12 VDC and circuit ground (GND) lines. These +12 VDC and GND lines are carried through the connector arrangement 30 to power the voltage source section 26. Control voltages from the voltage source section 26 are returned through the connector arrangement 30 via SET and TEMP lines, the functions of which are described hereinafter in detail.

The voltage source module 26 includes a pair of supply conductors $\overline{\text{HEAT}}$/COOL and HEAT/$\overline{\text{COOL}}$ which alternate relative polarity depending upon whether a heating mode or a cooling mode is selected. For example, during a cooling mode of operation, for example "Low Fan Speed Cool" or "High Fan Speed Cool", the $\overline{\text{HEAT}}$/COOL line is high, and the HEAT/$\overline{\text{COOL}}$ line is low. Conversely, during a heating mode of operation, for example "Low Fan Speed Heat" or "High Fan Speed Heat", the $\overline{\text{HEAT}}$/COOL line is low and the HEAT/$\overline{\text{COOL}}$ line is high. This arrangement achieves appropriate control logic inversion in the particular circuit illustrated, although it will be appreciated that other arrangements for switching between cooling mode and heating mode operation are possible, for example the arrangement disclosed in the above-identified commonly-assigned Alley et al application Ser. No. 151,855 or the arrangement disclosed in Pohl U.S. Pat. No. 4,290,481.

To achieve this result, the $\overline{\text{HEAT}}$/COOL line is supplied by the output of a CMOS digital logic NOR gate 36 having its inputs connected to the "Low Fan Speed Heat" (LOW HEAT) and the "High Fan Speed Heat" (HIGH HEAT) mode control lines. If either of these mode control lines is high, then the output of the NOR gate 36 and thus the $\overline{\text{HEAT}}$/COOL line is low. The HEAT/$\overline{\text{COOL}}$ line is supplied from the NOR gate 36 output through a digital logic inverter 38. The particular circuit illustrated operates from the +12 VDC supply connected to the CMOS gates 36 and 38. A logic high is defined as approximately +12 volts, and logic low is defined as approximately 0 volts.

For sensing room temperature and producing a temperature-dependent voltage, a thermistor circuit, generally designated 40, includes a negative temperature coefficient thermistor 42 included in an appropriate resistive network which, in the illustrated embodiment, comprises simply a voltage divider 40 connected between the $\overline{\text{HEAT}}$/COOL and the HEAT/$\overline{\text{COOL}}$ lines, and including a series resistor 44. The tap point of this voltage divider 40 supplies a voltage which is a function of temperature (as well as of selected mode) to the TEMP line. In this particular arrangement, during cooling mode operation, the TEMP voltage becomes less positive as sensed temperature increases. During heating mode operation, the TEMP line becomes less positive as sensed temperature decreases. Thus, the voltage on the TEMP line is directly representative of the actual degree of heating or cooling, depending upon whether it is a heating mode or a cooling mode operation which is selected.

The remaining portion of the voltage source module 26 comprises a reference voltage source 46 for establishing a temperature setting by providing a reference voltage on the SET line. To this end, the voltage source 46 includes a temperature setting potentiometer 48 comprising the user "temperature set" control connected in adjustable voltage divider configuration, with the tap 50 supplying the SET line. In this particular circuit, movement of the user control 48 towards the counterclockwise (CCW) end of the adjustment range decreases the temperature setting for both cooling modes and heating modes of operation, and movement of the user control towards the clockwise (CW) end of the adjustment range increases the temperature setting for both cooling modes and heating modes of operation. During cooling modes of operation, the CCW end of the potentiometer 48 is positive with respect to the CW end such that a decrease in user temperature setting causes the SET line to become more positive. During heating modes of operation, the CW end of the potentiometer 48 is positive with respect to the CCW end such that as a user control is moved towards higher temperature settings, the voltage on the SET line becomes more positive.

Although the CCW and CW ends of the potentiometer 38 might simply be connected directly to the $\overline{\text{HEAT}}$/COOL and HEAT/$\overline{\text{COOL}}$ lines respectively, or connected to these lines through simple range-limiting resistors, the particular form of temperature setting circuit 46 illustrated provides additional refinements for the dual purposes of slightly varying the calibration between heating mode and cooling mode operation to correspond with similar changes in the characteristics of the thermistor circuit 40, and providing independent limiting of the maximum user-selectable temperature setting during heating, and the minimum user-selectable temperature setting during cooling, for energy conservation purposes. Similar arrangements are disclosed in the above-identified commonly-assigned Alley et al application Ser. No. 151,855 and in the Pohl U.S. Pat. No. 4,290,481.

Specifically, the CCW end of the potentiometer 48 is connected to the tap point 52 of a selectable voltage divider 54 comprising a resistor 56 connected to the HEAT/$\overline{\text{COOL}}$ line, and a pair of resistances 57 and 58 alternately selected by respective series switching diodes 60 and 62, depending upon whether a cooling mode or heating mode of operation is selected.

The resistance 57 comprises a cooling mode trimmer resistor 64 in series with a fixed resistor 66. The cooling mode trimmer resistor 64 is adjustable, and serves to limit the minimum user-selectable temperature setting. When the trimmer resistor 64 is set to its maximum resistance, the range of user temperature setting is unrestricted. As the resistance of the resistor 64 is decreased, the user temperature adjustmentpotentiometer 48 becomes more limited in its ability to select lower temperature settings. During cooling mode operation when the HEAT/COOL line is high and the HEAT/COOL line is low, the switching diode 60 conducts, effectively placing the resistance 57 in the circuit.

The resistance 58 comprises simply a fixed resistor 58. The resistance 58 is effectively in the circuit during heating mode operation when the HEAT/COOL line is low, the HEAT/COOL line is high, and switching diode 62 is conducting.

Similarly the CW end of the potentiometer 48 is connected to the tap point 67 of another selectable voltage divider 68 comprising a fixed resistor 70 connected to the HEAT/COOL line and a pair of resistances 72 and 74 alternately selected by respective series switching diodes 76 and 78 depending upon whether a cooling mode or a heating mode of operation is selected.

The resistance 72 comprises a fixed resistor 72 and is effectively in the circuit during cooling mode operation when the HEAT/COOL line is high, the HEAT/COOL line is low, and the diode 76 is conducting.

The resistance 74 comprises a heat limiting trimmer resistor 80 connected in series with a fixed resistor 82, and is effectively in the circuit during heating mode operation when the HEAT/COOL line is low, the HEAT/COOL line is high, and the switching diode 78 is conducting. The function of the trimmer resistor 80 is to limit the maximum temperature setting selectable by means of the user-adjustable potentiometer 48 during heating mode operation. With the resistance 80 at its maximum resistance setting, the temperature setting range is at a maximum. As the resistance of the trimmer resistor 80 is decreased, the maximum user-selectable temperature setting is decreased for energy conservation purposes.

While there is no intention to limit the present invention to particular component values, the following table of resistance values is provided by way of exmaple for a better of understanding of the operation of the comparator-based thermostatic control circuit 24 depicted in FIG. 1:

TABLE

Setting Potentimeter 50:50 K Ohms
Resistor 56:11.8 K Ohms Resistor 58:18.7 K Ohms
Trimmer Resistors 64, 80:10 K Ohms, adjustable
Resistor 66:6.34 K Ohms
Resistor 70:11.5 K Ohms
Resistor 72:26.7 K Ohms
Resistor 82:12 K Ohms The dual-stage comparator section 28 of FIG. 1 is essentially identical to that which is disclosed in the above-identified commonly-assigned Alley et al application Ser. No. 151,855 to which reference may be had for a further description. Although the present invention is disclosed in the context of a dual-comparator, dual-stage heating and cooling system, as noted above it will be appreciated that the principles of the present invention apply equally well to single-comparator, single-stage temperature control systems for either heating, cooling or both.

In general, a dual comparator circuit 90 is responsive to the reference voltage on the SET line representative of desired temperature setting, and to the voltage on the TEMP line which varies as a function of temperature sensed by the thermistor 42. In particular, the SET line is applied through input resistors 92 and 94 to reference inputs of first and second stage comparators 96 and 98, respectively. In this particular circuit embodiment, the reference inputs are the comparator non-inverting (+) inputs, although it will be appreciated this is a mere matter of design choice depending upon the logic sense of the output desired. Correspondingly, the TEMP line is applied through input resistors 100 and 102 to comparison inputs of the comparators 96 and 98, respectively. In this particular embodiment, the comparison inputs are the comparator inverting (−) inputs. To provide a slight amount of hysteresis, positive feedback resistors 104 and 106 are connected to the comparator non-inverting (+) inputs. For maximum noise immunity, the comparators 96 and 98 have respective capacitors 108 and 109, for example 0.022 mfd each, connected directly across their inputs.

The outputs of the first and second stage comparators 96 and 98 drive STAGE1 and STAGE2 output lines, respectively, connected to the air conditioning unit 12 to effect appropriate operation.

In order to maintain a nearly constant temperature differential between the two stages for both heating modes and cooling modes of operation over a wide range of possible temperature settings, a biasing circuit arrangement, generally designated 110, is provided to establish a relatively constant threshold voltage differential between the comparators 96 and 98. The biasing circuit arrangement 110 serves to shift the voltage thresholds of the first and second stage comparators 96 and 98 with respect to each other. More particularly, the biasing circuit arrangement 110 includes a relatively high resistance, for example resistors 112 and 114, connected to cause a biasing current to flow between the positive and negative supply conductors through an input resistor of each of the first and second stage comparators 96 and 98. Specifically, the resistor 112 is connected between the +12 VDC supply conductor and the junction of the stage comparator 98 inverting (−) input with the input resistor 102, and the resistor 114 is connected between the negative supply conductor and the junction of the first stage comparator 96 inverting (−) input with the input resistor 100. In order to approximate a constant current source and to provide minimal disturbance, other than a differential, to the accuracy of the thermostatic temperature control, the resistances 112 and 114 have a relatively high resistance, for example 6.2 megohms each.

The current flow path as a result of the biasing circuit arrangement 110 is from the +12 VDC line through the resistor 112, through the input resistor 102, through the input resistor 100, and then through the resistor 114 to circuit ground. Current flow through the two comparison input resistors 100 and 102 is in opposite directions, thus providing the required differential.

With reference now to FIG. 2, there is illustrated, in accordance with the invention, one approach to modular addition of auxiliary or remote mode and temperature setting features to the basic circuit of FIG. 1. Specifically depicted in FIG. 2 is a relatively remote auxiliary mode control and temperature setting unit 118. For temperature setting purposes, the circuitry 118 of FIG. 2 is connected to the comparator circuit 90 directly in parallel with the user-adjustable local reference voltage source 46 of FIG. 1. Advantageously, this connection to the comparator circuitry 90 is effected by a simple connection to one of the portions of the FIG. 1 connector 30, for example the connector portion 34, shown in dash lines in FIG. 2. All that is required is a parallel connection to the SET line, together with appropriate connections to the +12 VDC and GND supply conductors. For remote mode selection, a pair of output lines 120 and 122 from the FIG. 2 circuitry are appropriately connected to the mode selection memory circuit 20 of FIG. 1. The particular connections employed depend to a large extent on the characteristics of the actual mode selection memory circuit 20 employed. The lines 120 and 122 may be connected to inputs of the mode selection memory 20 generally in parallel with the inputs from the mode selection input 18. Alternatively, such as in the case of mode selection memory circuits of the type described in commonly-assigned Pohl et al U.S. Pat. No. 4,287,939 or in commonly-assigned Sidebottom application Ser. No. 365,766, the lines 120 and 122 may be connected directly to appropriate ones of the output lines 22. These particular mode selection circuits are latching circuits arranged so as to accept inputs on their output lines (which operate at relatively high impedance levels), as well as on separate input lines.

The relatively remote auxiliary mode control and temperature setting unit 118 of FIG. 2 includes an auxiliary reference voltage source, generally designated 124, having a relatively lower output impedance with respect to the output impedance of the local reference voltage source 46 of FIG. 1. More particularly, the auxiliary reference voltage source 124 includes a resistive network 146 for establishing a voltage level, and an operational amplifier 148, connected in unity-gain configuration with the inverting (−) input tied to the output, serving as an output element. Advantageously, the operational amplifier 148 is powered from the +12 VDC and GND conductors. A National Type. No. LM358 integrated circuit operational amplifier is suitable.

The auxiliary reference voltage source 124, and more particularly the output of the operational amplifier 148, is connected through a switching element 150 to the reference inputs of the FIG. 1 comparators 96 and 98. Specifically, the output terminal 152 of the switching element 150 is connected to the SET line, which in turn is connected through respective input resistors 92 and 94 (FIG. 1) to the comparator 96 and 98 non-inverting (+) inputs.

Advantageously, particularly in relatively simple systems, the resistive network 146 for establishing an auxiliary reference voltage level comprises essentially a duplicate of the FIG. 1 reference circuitry 46. For convenience, elements in the FIG. 2 circuit corresponding to elements in the basic FIG. 1 circuit are designated by primed reference numerals. Two additional components in the FIG. 2 circuit are light emitting diodes (LED's) 154 and 156 which serve as indicators when remote selection of cooling mode or heating mode temperature set point, respectively, is selected.

The switching element 150 comprises one section of a 3P3T selector switch having two other sections 158 and 160. This 3P3T selector switch has a center position wherein the air conditioning unit 12 runs normally with the temperature setting established by the user-controlled reference voltage source 46 (FIG. 1), as the switch section 150 disconnects the FIG. 2 circuitry from the SET line. The 3P3T selector switch also has a "Cool" and a "Heat" position, in either of which the output of the operational amplifier 148 is connected through the switch section 150 to the SET line. In addition, the switch sections 158 and 160 appropriately connect the $\overline{\text{HEAT/COOL}}'$ and HEAT/$\overline{\text{COOL}}'$ lines to the +12 VDC supply line and the GND line to effect operation identical to that of the circuit 46 described hereinabove with reference to FIG. 1. Thus the voltage as a function of temperature set point characteristic of the FIG. 2 auxiliary reference voltage source 124 is identical to that of the FIG. 1 reference voltage source 46, and is identically altered as is appropriate depending upon whether a heating mode or a cooling mode of operation is being selected by the unit 118.

The $\overline{\text{HEAT/COOL}}'$ line and the HEAT/$\overline{\text{COOL}}'$ line are respectively connected through isolation diodes 162 and 164 to the lines 120 and 122 for remotely selecting either the "High Cool" mode or the "High Heat" mode. The isolation diodes 162 and 164 effectively serve to prevent power from being supplied to the circuit 146 other than through the switch sections 158 and 160.

Operation of the FIG. 2 remote auxiliary temperature setting circuit in a combination with the comparator-based thermostatic control circuitry of FIG. 1 depends upon the output impedance of the FIG. 1 reference voltage source 46 being higher than the FIG. 2 auxiliary reference voltage source 124. By way of exmaple, with the particular FIG. 1 resistor values identified hereinabove, the normal output impedance of the reference voltage source 46 applied to the SET line is greater than 7K Ohms. When the FIG. 2 auxiliary reference voltage source 124 is connected through the switch section 150 to the SET line, the output voltage of the operational amplifier 148 at least partly overrides the reference voltage source 46, establishing a different temperature set point depending upon the setting of the FIG. 2 potentiometer 48'. When the FIG. 2 selector switch comprising section 150 is switched back to the normal mode, temperature control reverts to the FIG. 1 local temperature setting potentiometer 48.

Depending upon the particular application, it may not be necessary for the FIG. 2 auxiliary temperature setting unit to provide highly accurate temperature setting. For example, if the output of the auxiliary reference voltage source 124 has an internal output impedance in the order of 1.5 K ohms the temperature set point of the air conditioning unit 12 can be commanded remotely to within about ±3° F. of an value within the control capability (approximately 50°–90° F. for both heating and cooling). In other words, the relatively remote auxiliary reference voltage source 124 overrides the relatively local reference voltage source 46 to a degree depending upon the relative output impedance levels. In the FIG. 2 embodiment where the operational amplifier 148 is employed, typically having an output impedance on the order of less than 100 ohms, the auxiliary reference voltage source 124 nearly completely overrides the main or local reference voltage source 46.

With reference now to FIG. 3, there is illustrated an embodiment of the invention suitable for use in more complex installations including a relatively large number of individual air conditioning units, such as the FIG. 1 unit 12, subject to central remote control, for example by means of a computer-controlled voltage source. In the embodiment of FIG. 3, a single source of command signals comprises a digital computer 170 connected through a DATA bus to a digital-to-analog converter 171, in turn connected through an analog multiplexer 172 and individual output lines 173, 173' and 173" to individual representative buffer amplifier and switching circuits 174, 174' and 174" connected to corresponding comparator circuits connected to corresponding air conditioning units through respective corresponding connector portions 34, 34' and 34" in the same manner as generally described above with reference to FIG. 2. The digital computer 170 has access to a look-up table 175 in memory wherein are stored digital voltage representations corresponding to particular temperature settings, and appropriately controls the digital-to-analog converter 171 and the analog multiplexer 172 through COMMAND lines, all in a manner well-known to those skilled in the art.

The buffer amplifier and switching circuit 174 includes an operational amplifier 176 comparable to the operational amplifier 148 of FIG. 2, and connected in unity-gain configuration. The output of the operational amplifier 176 is connected through a switching element 178 comprising a field effect transistor serving as an analog gate to the SET line.

The non-inverting (+) input of the operational amplifier 176 is supplied from the analog multiplexer 172 output line 173 through a sample and hold circuit 182 comprising a storage capacitor 184 and a series resistor 186. A relatively high bleeder resistance 188 is connected in parallel with the capacitor 184. For purposes of example, the capacitor 184 may have a value of 1.0 mfd, the series resistor 186 a resistance of 100 Ohms, and the bleeder resistor 188 a resistance of 1 megohm.

For controlling the switching action of the field effect transistor 178, voltage of the sample-and-hold storage capacitor 184 is amplified and by an amplifier 192 applied to the gate terminal 190 of the field effect transistor 178. Connected in series with the output of the operational amplifier 192 is a current limiting resistor 198. An LED 200 connected through the resistor 198 to the operational amplifier output serves to indicate when remote temperature setting control is in effect. In the illustrated embodiment, an amplifier voltage gain of approximately ten is achieved through the combination of an appropriate negative feedback resistor 194 (for example 10 K ohm) and a series input resistor 196 (for example 1 K ohm) connected between the amplifier 192 inverting (−) input and the circuit GND conductor. For the operational amplifiers 176 and 192 a National Type No. LM358 is suitable. The field effect transistor 178 may be a Type No. 2N6659.

In the operation of the FIG. 3 embodiment, when the remotely-commanded temperature set point on the line 173 is non-zero (greater than about 0.7 volts), approximately about 7 volts is applied to the gate 190 of the field effect transistor 178, which functions as an analog switch between its main terminals to connect the output of the operational amplifier 176 to the SET line. The temperature setting then becomes that which is commanded on the line 173.

When voltage on the line 173 is removed or otherwise goes to zero, the capacitor 184 either discharges through the resistor 186 or bleeds through the resistor 188, until the field effect transistor 178 turns off. The temperature setting then reverts to local control. With this arrangement, it will be appreciated that the system is fail-safe in that failure in the central control system resulting in an absence of voltage on the line 173 causes the unit to revert to local temperature control.

It will be appreciated by those skilled in the art that the manner of applying remote temperature setting voltages to the buffer and switch circuit 174 is examplary only, and any one of a number of specific circuit arrangements are possible. As one example, a digital-to-analog converter may be included in each of the buffer and switch circuits 174. While such an approach would allow communication with the unit 174 to be wholly digital in nature, this likely would be a more costly approach due to the relative expense of digital-to-analog converters.

Omitted from FIG. 3 are provisions for changing the operational mode of the air conditioning unit 12 under remote control. However, it will be appreciated to those skilled in the art that various forms of remote mode selection are possible, for example as disclosed in commonly-assigned Pohl et al U.S. Pat. No. 4,287,939.

With reference now to FIG. 4, there is depicted in conceptual form the manner in which remote temperature set-back capability in accordance with the invention can be applied to the comparator-based thermostatic control circuit 24 of FIG. 1. In FIG. 1, it will be appreciated that the TEMP line passing through the connector portions 32 and 34 comprises an electrical connection between the temperature responsive voltage source 40 and the comparator 96 and 98 comparison inputs, and the SET line similarly passing through appropriate terminals of the connector 30 portions 32 and 34 comprises an electrical connection between the reference voltage source 46 and the reference input.

As depicted in FIG. 4, an element generally designated 210, shown for purposes of example as the combination of a resistor 211 paralleled by an adjustable current source 212, is connected in series with one of these connections, illustratively the SET line. Inasmuch as sections of the SET line are no longer necessarily at the same voltage, the line portion connected to the connector portion 34 is designated SET'.

The purpose of the series element 210 is to selectively introduce an offset voltage in the SET line, thereby to effectively change the temperature setting. For example, each 0.1 volt of voltage offset changes the temperature setting by about 1° F., in a direction determined by mode and by offset polarity. Advantageously, the current source 212 is variable, facilitating selective voltage offset. Due to the relatively high input impedance of the FIG. 1 comparator circuit 90, introduction of the series resistance 211 causes no particular adverse effect on operation. For example, a series resistance of 10 K ohms would not adversely affect the circuit operation.

In the particular embodiment illustrated, only one polarity for the current source 212 is required for normal system operation. Specifically, a positive offset voltage has the effect of increasing temperature set point during heating mode operation, and decreasing temperature set point during cooling mode operation, which are exactly the effects normally desired. In other systems, it may be necessary to provide an offset voltage-introducing element capable of generating either positive or negative offset voltage polarities.

As will be appreciated from the schematic drawing of FIG. 4, remote or auxiliary offset capability may readily be introduced in modular fashion in an arrangement such as that illustrated in FIG. 1 wherein the voltage source module 26 and the main control module 28 are separated by the electrical connector 30 comprising portions 32 and 34.

FIG. 5 illustrates a practical circuit embodying the concept illustrated in FIG. 4. In FIG. 5, an operational amplifier 220 is connected in a unity-gain circuit 221 configuration in series with the SET and SET' lines, and referenced to local circuit ground (GND). Specifically, the SET line is connected to the amplifier 220 non-inverting (+) input and the amplifier 220 output is connected to the SET' line. To provide unity-gain, a negative feedback resistor 222 and an input resistor 224, connected to circuit ground (GND), each have the same value, for example, 10 K ohm.

In order to introduce a controlled offset voltage, the operational amplifier inverting (−) input is connected through a relatively higher series resistance 226, for example, 100 K ohms, to the movable wiper 228 of a potentiometer 230 connected between to a ±6 VDC supply source. In order to accurately reduce the offset voltage introduced to zero when remote temperature set-back is not desired, the potentiometer 230 has a fixed tap point 232 at the potentiometer midpoint connected to the GND line.

With the set-back control 238 in the center, no change from the normal unit control established by the FIG. 1 reference voltage 46 is made. The output of the operational amplifier 220 is the same as the input. With the control 230 offset, either a positive or negative offset is made to the DC SET voltage. With this circuit it will be appreciated that the amount of the voltage offset between the SET and SET' lines remains relatively constant regardless of the actual voltage on the SET line.

It will be appreciated that the circuits of FIGS. 4 and 5 can be connected in either the SET line or the TEMP line to achieve the same results insofar as the basic comparator-based thermostatic control circuit 24 (FIG. 1) is concerned. However, it is advantageous to make the required series connection in the SET line, rather than in the TEMP line, so that other control functions of the air conditioning unit 12 dependent upon the thermistor 42 (FIG. 1) are not affected. For example, other such control functions which depend to some extent on the voltage on the TEMP line actively reflecting thermistor 42 temperature are compressor protection functions, indoor and outdoor heat pump defrosting functions, selective lock-out of auxiliary electrical resistance heat, and freeze sentinal circuitry. "Freeze sentinel" circuitry functions to ensure that room temperature does not fall below 40° F. regardless of user control settings, and when such circuitry is included it is particularly important that the TEMP line not be disturbed.

Figure 6:
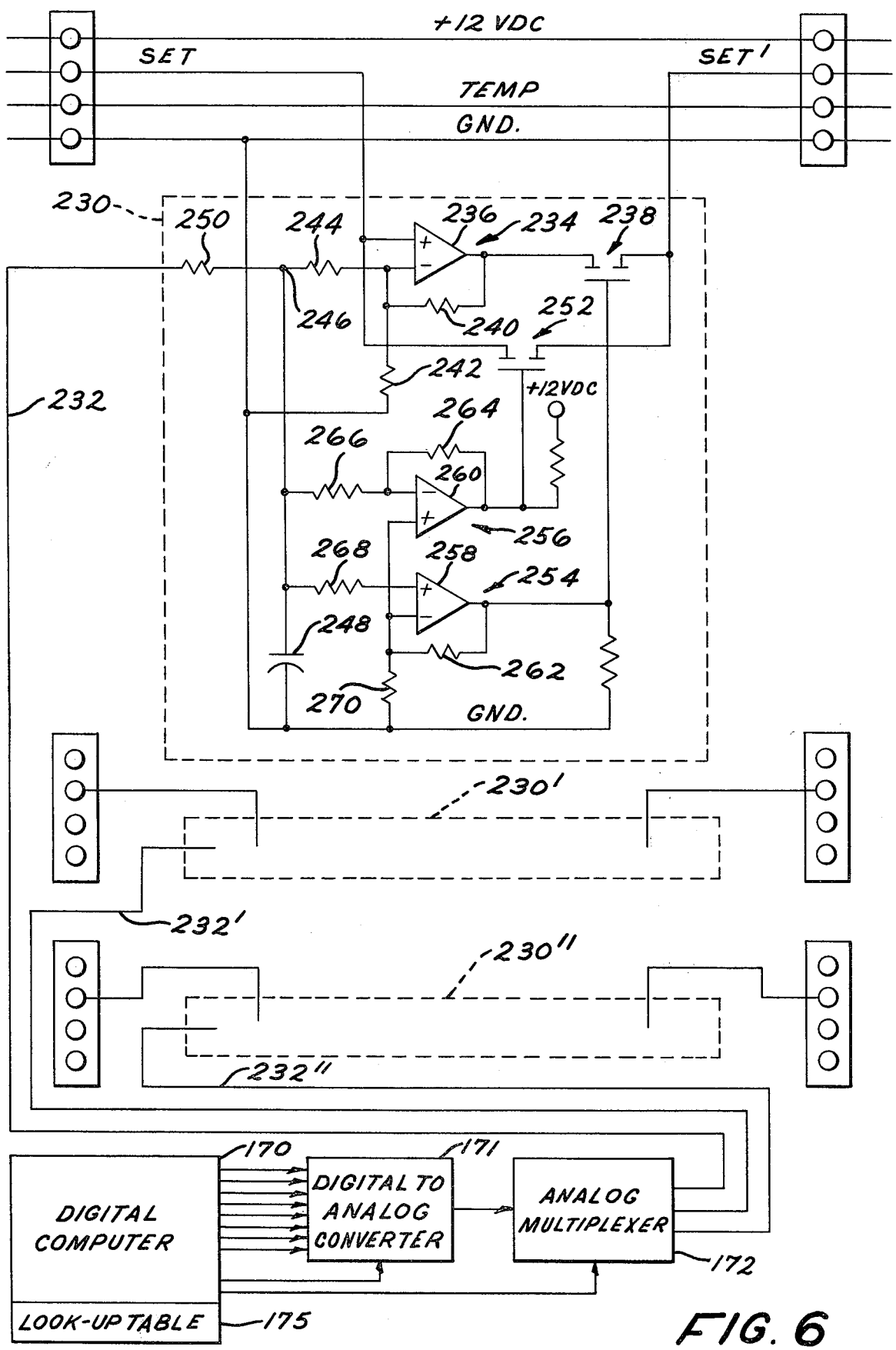
FIG. 6 is a combination block diagram and electrical schematic circuit diagram of a remote temperature set-back thermostatic control system comprising a plurality of individual room units controlled from a central location.

With reference finally to FIG. 6, there is illustrated a circuit in which the set-back control circuit of FIG. 5 may be applied to a multiple unit system. Thus, the multiple set-back circuit of FIG. 6 is generally comparable to the multiple remote temperature set circuit of FIG. 3, and is likewise controlled by a digital computer 170 having an access to an appropriate look-up table 175, and connected through a digital-to-analog converter 171 and analog multiplexer 172 to individual interfacing circuits 230, 230' and 230".

Representative interface circuit 230 is supplied with voltage command signals along a line 232 from the analog multiplexer 172. The interface circuit 230 includes the unity-gain operational amplifier circuit 234 generally comparable to the circuit 221 of FIG. 3, and arranged to introduce a controlled voltage offset. As in FIG. 3, the unity-gain operational amplifier circuit 234 comprises an operational amplifier 236 with its non-inverting (+) input connected to the SET line, and its output connected through a controlled switching element 238 comprising a field effect transistor serving as an analog switch to the SET' line.

To provide unity-gain, connected to the operational amplifier 236 are equal-valued negative feedback 240 and input 242 resistors connected to the GND line.

To introduce controlled voltage offset, the inverting (−) input of the operational amplifier 236 is connected through a resistor 244, for example 100 K ohm, to a circuit node 246 having a voltage established corresponding to the offset voltage to be introduced.

In particular, voltage at the node 246 is established by a sample-and-hold circuit comprising storage capacitor 248 and series resistor 250 connected to the line 232.

In the particular circuit of FIG. 6, the field effect transistor (FET) switching element 238 conducts when an offset voltage is to be introduced, and another switching field effect transistor (FET) 252 conducts when no offset voltage is to be introduced, thereby entirely bypassing the operational amplifier 236 and effectively directly connecting the SET line to the SET' line.

To control the operation of these two FET analog switches 238 and 252, a pair of operational amplifier circuits 254 and 256 of moderate gain (e.g. a gain of ten) are connected to sense the voltage on the sample-and-hold capacitor 248, and appropriately alternately switch the FET analog switches 238 and 252 into conduction. Each of the operational amplifiers circuits 254 and 256 comprises a corresponding operational amplifier 258 or 260, for example, included within a National Type No. LM224 integrated circuit package. For establishing appropriate gain, these operational amplifiers 258 and 260 have negative feedback resistors 262 and 264, for example of 1 megohm, and series input resistors 266, 268 and 270, for example each 100 K ohm.

In operation, whenever the command voltage on the input line 232 is near zero, the output of the operational amplifier 260 is high, biasing the FET analog switch 252 into conduction, in effect directly connecting the SET and the SET' lines. At the same time, the output of the operational amplifier 258 is essentially zero, and the FET analog switch 238 is not conducting, and the controlled offset voltage amplifier 236 is thus out of the circuit.

When a non-zero command voltage is applied along the conductor 232, then the situation is reversed. Output voltage of the operational amplifier 260 goes towards zero, turning off the FET switch 252. At the same time, output voltage of the operational amplifier 258 increases, turning on the FET analog switch 238, connecting the output of the controlled offset voltage operational amplifier 236 to the SET' line. The control offset voltage operational amplifier then introduces an appropriate offset voltage between the SET and the SET' lines in the same manner as described hereinabove with reference to FIG. 5.

As in the case of the multiple unit circuit of FIG. 3, failure of the computer system or a zero input, automatically reverts the individual air conditioning units to their own local control.

While specific embodiments of the invention have been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. A thermostatic control system having auxiliary temperature setting capability, said system comprising:
a temperature-responsive source for producing a temperature-dependent voltage as a function of sensed temperature;

a reference voltage source having a relatively higher output impedance and producing a reference voltage for establishing a temperature setting;

a voltage comparator having a comparison input connected to said temperature-responsive source and a reference input connected to said reference voltage source for producing a control output signal for energizing a thermal conditioning element when the temperature-dependent voltage and the reference voltage have at least a predetermined relationship with respect to each other; and an adjustable auxiliary reference voltage source for auxiliary temperature setting, said auxiliary reference voltage source having a relatively lower output impedance and connected through a switching element to said voltage comparator reference input such that said auxiliary reference voltage source at least partly overrides said reference voltage source when said switching element is conducting, and said auxiliary reference voltage source including a source of command signals in digital form and a digital-to-analog converter.

2. A thermostatic control system in accordance with claim 1, which comprises a plurality of individual units each including a temperature-responsive voltage source, a corresponding reference voltage source, and a corresponding voltage comparator connected for energizing a corresponding thermal conditioning element, and which further comprises a single source of command signals shared in multiplexed fashion to serve as the auxiliary reference voltage source for each individual unit.

3. A thermostatic control system having auxiliary temperature setting capability, said system comprising:

a pair of modules and an electrical connector having terminals for providing electrical connection between said modules;

one of said modules including a temperature-responsive source for producing a temperature-dependent voltage as a function of sensed temperature, and a reference voltage source having a relatively higher output impedance and producing a reference voltage for establishing a temperature setting;

the other of said modules including a voltage comparator having a comparison input connected to said temperature-responsive source through one of said connector terminals and a reference input connected to said reference voltage source through another of said connector terminals for producing a control output signal for energizing a thermal conditioning element when the temperature-dependent voltage and the reference voltage have at least a predetermined relationship with respect to each other; and an auxiliary reference voltage source for auxiliary temperature setting having a relatively lower output impedance and connected through a switching element to said other of said terminals of said electrical connector and thus to said voltage comparator reference input such that said auxiliary reference voltage source at least partly overrides said reference voltage source when said switching element is conducting.

4. A thermostatic temperature and mode control system for an air conditioning unit having a heating mode and a cooling mode of operation and at least one thermal conditioning element, said control system having both relatively local and relatively remote temperature setting and mode selection capability, and said control system comprising:

a mode selection control circuit having inputs for accepting mode selection commands and outputs operatively connected to the air conditioning unit to effect desired operation of the thermal conditioning element;

a relatively local user-operable mode selection unit connected to said mode selection control circuit inputs;

a temperature-responsive source for producing a temperature-dependent voltage as a function of sensed temperature;

a relatively local reference voltage source having a relatively higher output impedance and producing a reference voltage for establishing a temperature setting;

a voltage comparator having a comparison input connected to said temperature-responsive source and a reference input connected to said reference voltage source for producing a control output signal for appropriately energizing the thermal conditioning element in accordance with the selected mode when the temperature-dependent voltage and the reference voltage have at least a predetermined relationship with respect to each other;

a relatively remote auxiliary mode control and temperature setting unit including reference voltage source having a relatively lower output impedance and connected through a switching element to said voltage comparator reference input such that said auxiliary reference voltage source at least partly overrides said reference voltage source when said switching element is conducting, and an auxiliary mode control switch connected to said mode selection control circuit for remote mode selection.

5. A thermostatic temperatue and mode control system in accordance with claim 4, wherein the voltage as a function of temperature set point characteristics of said reference voltage source and of said auxiliary reference voltage source vary depending upon whether the heating mode or the cooling mode of operation is selected, and the auxiliary mode control switch functions to select the characteristics of the auxiliary reference voltage source.

6. A thermostatic control system having selective temperature offset capability, said system comprising:

a temperature-responsive source for producing a temperature-dependent voltage as a function of sensed temperature;

a reference voltage source producing a reference voltage for establishing a temperature setting;

a voltage comparator having a comparison input and a reference input for producing a control output signal for energizing a thermal conditioning element when voltages applied respectively to the comparison and reference inputs have at least a predetermined relationship with respect to each other;

an electrical connection between said temperature-responsive voltage source and the comparison input, and an electrical connection between said reference voltage source and the reference input; and an element connected in series with one of said electrical connections for selectively introducing an adjustable offset voltage, said series element being connected to receive control signals from a source of command signals in digital form and a digital-to-analog converter.

7. A thermostatic control system in accordance with claim 6, which comprises a plurality of individual units each including a temperature-responsive voltage source, a corresponding reference voltage source, a corresponding voltage comparator connected for energizing a corresponding thermal conditioning element, and a corresponding series element, and which further comprises a single source of command signals shared in multiplexed fashion to provide control signals to the individual series elements.

8. A thermostatic control system having selective temperature offset capability, said system comprising:
   a pair of modules;
   one of said modules including a temperature-responsive source for producing a temperature-dependent voltage as a function of sensed temperature, and a reference voltage source producing a reference voltage for establishing a temperature setting;
   the other of said modules including a voltage comparator having a comparison input and a reference input for producing a control output signal for energizing a thermal conditioning element when voltages applied respectively to the comparison and reference inputs have at least a predetermined relationship with respect to each other;
   an electrical connection between said temperature-responsive voltage source and the comparison input, and an electrical connection between said reference voltage source and the reference input, said electrical connection comprising an electrical connector having two portions respectively connected to corresponding ones of said pair of modules; and
   an element connected in series with one of said electrical connections for selectively introducing an offset voltage, said series element being connected between said connector portions.

* * * * *